United States Patent [19]

Wienert

[11] 3,894,865

[45] July 15, 1975

[54] PRODUCTION OF METALLURGICAL PELLETS IN ROTARY KILNS

[76] Inventor: Fritz O. Wienert, 394 Roosevelt Ave., Niagara Falls, N.Y. 14305

[22] Filed: Apr. 4, 1973

[21] Appl. No.: 347,718

Related U.S. Application Data

[63] Continuation-in-part of Ser. No. 54,004, July 10, 1970, abandoned.

[52] U.S. Cl. .......................... 75/21; 75/36; 75/90; 75/130.5
[51] Int. Cl. ............................................. C21b 13/08
[58] Field of Search .......... 75/21, 33, 36, 130.5, 90

[56] References Cited
UNITED STATES PATENTS

| | | | |
|---|---|---|---|
| 2,905,546 | 9/1959 | Harris | 75/130.5 |
| 2,912,319 | 11/1959 | Moklebust | 75/33 |
| 2,941,791 | 6/1960 | Wienert | 75/34 |
| 3,170,786 | 2/1965 | Moklebust | 75/34 |
| 3,224,871 | 12/1965 | Collin | 75/36 |
| 3,317,308 | 5/1967 | Greffe | 75/33 |
| 3,328,161 | 6/1967 | Rausch et al. | 75/33 |
| 3,386,816 | 6/1968 | English | 75/36 |
| 3,400,179 | 9/1968 | Wienert | 264/15 |
| 3,486,883 | 12/1969 | Heitmann | 75/33 |
| 3,684,485 | 8/1972 | Meyer et al. | 75/21 |

*Primary Examiner*—L. Dewayne Rutledge
*Assistant Examiner*—M. J. Andrews
*Attorney, Agent, or Firm*—Ashlan F. Harlan, Jr.

[57] ABSTRACT

When pellets made from non-silicious iron oxide-bearing material and interspersed carbon particles pass, for reduction, through a rotary kiln countercurrent to flame gases, they are protected against abrasion and breakage by a number of measures which are cumulative in effect and comprise: increasing the heat stability of the pellets, especially the shell portion thereof, prior to entry into the kiln, combusting the burner fuel completely in a wide, relatively short combustion zone, maintaining a low concentration of free oxygen in the portion of the combustion zone adjacent the discharge end of said kiln, heating the pellets rapidly and progressively to temperatures higher than 1,100°C but without fusion thereof, admitting free oxygen into the kiln gases coming from the combustion zone, restricting the sum of the cascading paths of the pellets by the use of the maximum practicable slope for the kiln, and by having a ratio of kiln length to inside diameter smaller than 15:1. By these measures the abrasion of fines from the pellets is minimized and thus, also, the formation of accretions on the kiln wall. In a variation of the novel process, chrome oxide combined with iron oxides in the form of chromite ores may be reduced by carbon in addition to the iron oxides.

Iron powder in which the crystal growth of the reduced iron has been hindered during the reduction may be obtained from kiln-reduced pellets by wet grinding of the pellets and magnetic separation of the iron from the resulting slurry. The kiln-reduced pellets may be desulfurized at elevated temperatures in the presence of hydrogen by a sulfur acceptor, such as the oxides and carbonates of calcium, magnesium and manganese.

18 Claims, No Drawings

PRODUCTION OF METALLURGICAL PELLETS IN ROTARY KILNS

BACKGROUND OF THE INVENTION

This application is in part a continuation of copending application Ser. No. 54,004, filed July 10, 1970, now abondoned.

This invention relates to a process for the reduction of pellets made from a mixture of non-silicious iron oxide-bearing materials and carbonaceous particles, the latter serving subsequently as a reductant.

Continuously operated rotary kilns fired internally by combustion of fuel and operated with the flame and the resultant combustion gases moving countercurrent to the flow of heated material are well known. They have been used for the reduction of iron oxides to sponge iron grains and pellets and in a known process wherein pellets of iron oxides are surrounded by, i.e. embedded in, a loose mass of carbonaceous particles while they travel through the rotary kiln. The carbon particles form carbon monoxide which diffuses into the pellets for reducing the oxides. Although the use of a higher temperature would increase the rate of reduction of the iron oxides, a temperature of about 1,100°C cannot be exceeded in this process because fines abraded from the pellets would sinter on the interior wall of the kiln to such an extent as to make practical operation impossible. Because of this temperature limit and also because a large part of the kiln bed is occupied by carbon particles, the reduction capacity of the kiln in such operation is, in any event, small.

In another known process for metallization, briquettes or pellets made from finely divided iron ore and carbonaceous particles are passed through a rotary kiln without being surrounded by carbon particles, but in contact with gases obtained by operating the flame with a deficiency of air so that it contains no free oxygen. The metallization is accomplished essentially by carbon monoxide formed from the carbon particles inside the pellets. In this process, the temperature of the pellets must not exceed 850° to 950°C if excessive formation of fines and sintering on the kiln wall are to be avoided. Because of this low temperature, the reduction rate and, therefore, the production capacity of the kiln are low. The necessarily slow passage of the pellets through the kiln has another drawback, in that water vapor and carbon dioxide in the flame gases oxidize a significant part of the carbon particles in the outer portions of the pellets, thus decreasing the pellet strength and increasing the tendency for them to abrade and form fines.

SUMMARY OF THE INVENTION

The present invention has an object of the provision of an improved process for the reduction of pellets containing non-silicious iron oxide-bearing materials and carbon particles while they travel through a rotary kiln countercurrent to combustion gases in such a way that the deterioration of the pellet into fines and pieces is minimized and high temperatures in the pellets can be reached, thereby causing a fast reduction and favorable properties in the reduced pellets.

The term "pellets" as used herein means relatively small bodies of various shapes as, for instance, spheres made by agglomeration of fines particles with moisture by the so-called balling action; by compacting particles with the help of high static pressure, in which case, the resulting bodies are often called briquettes; by the use of dynamic pressure to produce extruded bodies; or by other suitable procedures, for example by the method disclosed in U.S. Pat. No. 3,400,179.

The term "non-silicious iron oxide-bearing material" as used herein means iron oxide-containing ores, for example, hematite, magnetite, laterite, ilmenite, chromite, and concentrates and mixtures thereof, and industrial products, such, for example, as roasted iron sulfides, mill scale, materials removed by grinding and scarfing, and dust and fines from blast furnaces, basic oxygen furnaces and the like, which ores and products contain no more than about 10% silica. Ores ordinarily referred to as silicious iron ores may contain from about 15% to as much as 35% silica or more.

In the present process, a major portion of the metallization is represented by the reaction

(1) $FeO + C \rightarrow Fe + CO$, the metallization by gases, so important in other processes, being considered of minor importance. Consequently, the amount of carbon contained as particles in the pellets must be at least that stoichiometrically required for the stated reaction. The use of excess carbon is favorable for obtaining a high degree of metallization, particularly when the reduction of other oxides is also desired. The rapid evolution of carbon monoxide which takes place in this improved process at temperatures higher than about 1,100°C minimizes the reoxidation of already formed metallic iron and prevents too rapid oxidation of carbon in the outer portion of the pellets by free oxygen, carbon dioxide, and water vapor in the combustion zone.

More specifically, the present invention has as an object the improvement of a process for treating pellets formed from a mixture of non-silicious iron oxide-bearing material and particulate carbon to cause the reduction of the iron oxide in said material, while said pellets are passed, without embedding solid carbonaceous particles, through a rotating tubular kiln in cascading paths and generally countercurrent to the hot products of combustion from a combustion zone resulting from a heating flame produced from fluid fuel, such as gas or oil and air, to produce reduced pellets of improved properties, to minimize the physical deterioration of the pellets during heating, and to increase the effective capacity of the kiln.

The improvement is achieved by: (a) using pellets which contain particulate carbon in at least the ratio with respect to the iron oxide present required by the equation $FeO + C = Fe + CO$; (b) establishing the combustion zone adjacent the discharge end of the kiln; (c) heating the pellets continuously to progressively higher temperatures in their passage through said kiln to a temperature in excess of 1,100°C but below the temperature at which the pellets fuse together, whereby carbon monoxide is formed by metallization of said iron oxide; (d) providing the heating flame with oxygen in an amount exceeding the amount required for complete combustion and maintaining in the portion of the combustion zone adjacent the discharge end of the kiln, for contacting said pellets, from 0.1 to 5.0 volume % of free oxygen; (e) introducing additional free oxygen into the hot gases leaving the combustion zone at a point adjacent to said zone and in such amount as to oxidize a portion of said carbon monoxide; and (f) passing the pellets through the kiln is less than 1.5 hours. It should be noted that the free oxygen referred to above need not be pure, the oxygen in air being considered "free." It is obvious from the manner in which heat is produced in the kiln that the pellets undergo a continuous increase in temperature as they pass through the kiln.

The favorable effect of the above-described measures in cummulative, as will be shown hereinafter. Additional improvement may be obtained by limiting the length of the combustion zone to not more than six times the inside diameter of the kiln, by limiting the kiln length to a ratio less than 15:1 with respect to the inside diameter of the kiln, and by employing the maximum practicable slope for the kiln.

DESCRIPTION OF PREFERRED EMBODIMENTS

In the following examples the effect of the several factors which contribute to the improvements mentioned above is demonstrated, Example 1 showing the relatively high abrasion and breakage of pellets which occur without a short combustion zone, without excess free oxygen in that zone, and without oxygen being introduced into the hot gases leaving that zone.

EXAMPLE 1

The rotary kiln used was 6.1 m (20 ft.) long. Its inside diameter was approximately 0.508 m (1.67 ft.) so that the ratio of length to inside diameter (L : I.D.) was 12:1. The slope of the kiln was 4.17 cm per meter (0.5 in, per foot) of length. The rotational speed was 1.07 rpm. The pellets used had a diameter of about 16 mm (0.63 in.) and had been made substantially in accordance with the disclosure of U.S. Pat. No. 3,400,179, employing a mixture of dust and fines, derived from a blast furnace and a basic oxygen furnace, with ground coke breeze. They contained, by analysis, 51% total Fe, 46.4% trivalent Fe as oxide, 4.6% bivalent Fe as oxide, 16.0% C, 3.1% silica, 1% bentonite, the balance being mainly $CaCO_3$ and coke ash.

The dried pellets were charged at the inlet end, where the exhaust gases were withdrawn through a cyclone separator into a stack. The burner in the discharge head of the kiln was supplied with combustible gas and air in the ratio 1:9.5. As the theoretical ratio for complete combustion of the specific gas employed was 1:10, free oxygen was not present in a substantial part of the combustion zone. The flame was 2.74 m (9 ft.) long, which was close to the upper limit of the favorable range of 6 times the inside diameter. The draft in the kiln was adjusted in such manner that a slight overpressure in the discharge head prevented air from entering the kiln. At a feed rate of approximately 181 kg (400 lbs.) per hour the pellets remained in the kiln about 1 hour. The bed temperature close to the discharge end of the kiln was 1,220°C.

The discharged pellets were cooled under a blanket of natural gas and contained 1% residual carbon, 85% of the contained iron being metallic. However, 15% of the discharge consisted of pellet fragments ranging in size from 2 to 6 mm (0.08 in. to 0.24 in.) and the pellets representing the balance of the discharge had other small piece sintered to their surfaces. A part of the fines abraded from the pellets was entrained in the kiln gases and carried out of the kiln. Another portion thereof formed a sintered ring on the interior kiln wall in the hot zone which extended for a length of about 2.44 m (8 ft.) from the burner tip. The thickness of the ring varied in the longitudinal direction of the kiln and increased at an average rate of 10 mm (0.39 in.) per hour. The total amount of the fines, including the fines carried out of the kiln and those sintered on the kiln wall, and of loose small fragments among the pellets was estimated as 30% of the expected reduced product. Such a kiln operation cannot be considered practical.

In the following example, free oxygen was present in a substantial part of the combustion zone and a shorter combustion zone was used.

EXAMPLE 2

The same kiln and gas and same type of pellets were used as in Example 1 and the feed rate was also the same. However, the gas to air ratio in the burner was changed to 1:11 so that the combustion gases were generally oxidizing and contained a calculated 1.8 volume % of free oxygen. Furthermore, the draft in the kiln was increased, so that a slightly reduced pressure in the discharge head allowed some air to enter the kiln and contact the hot pellets, and spiral vanes in the burner were so adjusted that the flame was broader and extended only 1.52 m (5 ft.) into the kiln. As in Example 1, the pellets were retained in the kiln for 1 hour. The bed temperature at the discharge end was 1,250°C.

After cooling the discharged pellets as in Example 1, the residual carbon content of the pellets was found to be 0.5% and 90% of the iron was in the metallic form. Of the total discharge, about 5% consisted of fragments ranging in size from 2 to 6 mm (0.08 in. to 0.24 in.) and the pellets had only a few small fragments sintered on their surfaces. The ring of sintered fines on the kiln wall extended longitudinally for only approximately 1.52 m (5 ft.) from the discharge end and its average thickness grew at a rate of approximately 3 mm (0.12 in.) per hour. The total amount of fines and fragments was estimated to be 15% of the expected total output.

As a measure for further improving the process, additional free oxygen may be introduced into the kiln gases coming from the combustion zone by blowing air into the kiln. This increases the heating rate of the pellets by combusting at least a part of the carbon monoxide formed in and given off by the pellets (according to equation 1) and, therefore, shortens the period during which the abrasion rate is high since recrystallization in the pellets with new bonding of the constituent particles is rapid at temperatures above about 800°C. The beneficial effects of additional free oxygen are given in the following example.

EXAMPLE 3

In this example the kiln type of pellets, feed rate, flame composition and shape, and draft setting to draw air into the discharge end where the same as in Example 2. However, approximately 14.2 m³ (500 ft.³) of air per hour were blown into the 6.1 m (20 ft.) long rotary kiln at a point approximately 2.74 m (9 ft.) from the discharge end. The air was directed essentially parallel to the kiln axis toward the exhaust end so that it mixed with the gases coming from the combustion zone and combusted a part of the carbon monoxide generated according to reaction 1 and present in said gases. The air was provided by a blower, mounted on the shell of the kiln and electrically driven, through a pipe extending through the shell and its refractory lining.

The temperature of the discharged pellets was approximately the same as in Example 2. The cooled discharged pellets showed 93% of the total iron as metal and the residual carbon content was 3.5%. The sintered ring on the kiln wall measured roughly 1.52 m (5 ft.) in length but increased in thickness only at the rate of about 2 mm (0.08 in.) per hour. The discharge contained about 5% of the pellet fragments and the total amount of fragments and fines was estimated at 10% of the expected output.

In the foregoing campaigns, where the kiln was 6.1 m (20 ft.) long with a slope approximately 4.17 cm per meter (0.5 in. per ft.) of length, the slope was sufficient to keep the sum of the cascading paths of the pellets relatively small so that the extent of deterioration of the pellets in Example 3 was acceptable. It will be clear that in a longer kiln such as is required for industrial production, the same slope results in a larger total of the cascading paths of the pellets, thus increasing abrasions of the pellets.

The detrimental effect of longer cascading paths on the abrasion of pellets was further demonstrated when a rotary kiln was used which had a length of 24.4 m (80 ft.) and an inside diameter of approximately 1.37 m (4.5 ft.), making the ratio of length to inside diameter 17.7:1. The slope of the kiln was 4.17 cm per meter (0.5 in. per ft.) of length. The kiln was rotated at 1.1 rpm. The gas to air ratio in the burner was 1:11.1 which left a slight concentration of free oxygen in a substantial part of the combustion zone. Amount of additional air was drawn into the kiln as a result of a slightly reduced pressure in the discharge head. The flame was roughly 9.14 m (30 ft.) long, too long to be considered an improving measure. The charge remained about 85 minutes in the kiln which is near the recommended upper limit of 1.5 hours. The temperature of the discharge was difficult to control and varied between 1,200° and 1,250°C. Only about 10% of the expected yield was discharged in the form of pellets. A sintered ring of fines formed quickly within the kiln along a large part of the total length thereof and interfered with the kiln operation. The extended paths of the pellets and consequent prolonged time available for abrasion before the pellets reached the temperature at which sintering began were a consequence of the small slope of the long kiln and apparently the principal reasons for the severe deterioration of the pellets.

To shorten the cascading pellet paths, it is obvious that the slope of the kiln should be greater, the longer the kiln. However, usually a slope greater than about 10° from the horizontal is not practicable. The slope of the 6.1 m kiln, i. e. 4.17 cm per meter of length, is about 2° and is quite satisfactory. Therefore, a slope from about 2° to about 10°, depending on the kiln length, is preferred.

It is obvious that characteristics of the pellets themselves also affect the extent of their abrasion when they are heated in a rotary kiln. For instance, if commonly used organic binders such as lignin sulphonates or molasses are employed, their pyrolysis on heating weakens the bond between the particles in the pellets. On the other hand, if inorganic binders such as alkali silicates or clays like bentonite are used, the bond is more heat-stable. For satisfactory bonding in known pellet forming procedures, such inorganic binders must often be used in relatively high and, therefore, uneconomical proportions. A method of using less alkali silicate by impregnating the outer portions of pellets with an aqueous solution thereof to form a heat-stable shell can, however, be employed. The beneficial effect of such a shell on the abrasion of pellets is illustrated in the following example.

EXAMPLE 4

The same type of pellets as used in Example 1 was employed. They were dried, dipped for several seconds into a 25% aqueous solution of sodium silicate, dried again, and heated in the 6.1 m (20 ft.) long rotary kiln in substantially the same manner and with the same feed rate as in Example 3. The temperature of the discharged pellets was 1,240°C. A thin sintered ring about 0.61 m (2 ft.) long formed on the kiln wall. Its thickness increased at a rate of less than about 1 mm (0.039 in.) per hour and the ring was periodically removed, without interrupting the kiln operation, by inserting a water-cooled cutter into the kiln through the burner head. The amount of charge not recovered in the form of pellets was estimated as only 3% of the expected yield. The reduced pellets were cooled in an atmosphere of natural gas and contained 92.5% of the total iron in the metallic form and 3.2% C. Their size was roughly 15 mm (0.59 in.) in diameter and the average crush load of the metallized pellets was approximately 36.3 kg (80 lbs.) when single pellets were pressed between parallel plates.

Although in carrying out the present invention as exemplified in this and the other specific examples the pellets used must contain particulate carbon in at least the ratio with respect to the iron oxide present required by equation 1, the addition of a relatively small amount of loose carbon particles in a portion of the kiln may be advantageous, as set out below.

In a further experiment, the procedure of Example 4 was repeated, the kiln being operated for three hours, during which period approximately 5.44 kg (12 lb.) per hour of coke breeze, ground to pass a 24 mesh Tyler sieve, were added to the bed of pellets under the burner flame. The bed temperature close to the discharge end rose to 1,280°C. No substantial amount of unburned coke particles was found mixed with the discharge reduced pellets which were chilled with a limited amount of water. No reoxidation of the metallic iron in the pellets was observed. The pellets contained 93% of the total iron in the metallic form and 4.5% C. Their diameter was about 13 mm (0.51 in.) and their average crush load was 68.0 kg (150lbs).

These results show that the combustion of the added loose coke particles had increased the bed temperature and thus improved the properties of the reduced pellets.

The present invention also comprehends a novel way of hardening the shell portion of pellets to be reduced by the above-described procedure. It involves the use of bentonite instead of alkali silicates and is particularly useful if the presence of alkali in the reduced pellets is not desired as, for example, when they are used as part of a blast burden. Such novel method comprises incorporating bentonite or similar clay material in the outer portion of the pellets in a concentration ranging from approximately 1.5 to about 6%. Higher concentrations are possible but they become less economical and often result in cracks when the pellets are dried. The method is preferably carried out by tumbling the pellets, while still moist, over a surface with hilly protrusions while a powdered mixture containing the bentonite is spread over the tumbling pellets and water is sprayed over them, if necessary, until the desired thickness of coating is reached. The coating powder, apart from the bentonite, may be the same as used for making the pellets or it may contain a larger proportion of carbon particles.

A further way of improving the heat stability of the outer portions of pellets which contain uncombined ferric oxide ($Fe_2O_3$) comprises forming said outer portion from iron oxide-bearing material which is free of uncombined ferrix oxide. Such material includes natural magnetite, mill scale, and iron oxides partly reduced by gases. It will be understood that the shell portion free of uncombined ferric oxide can be additionally heat-stabilized by the use of alkali silicates or bentonite. Use of the latter is illustrated in the following example.

EXAMPLE 5

Moist pellets such as were used in Example 1 were tumbled in a rotating drum having hilly protrusions on the inner surface thereof. A mixture containing 78 parts of mill scale ground to pass a 150 mesh Tyler sieve, 18 parts of coke particles passing a 24 mesh Tyler sieve, and 4 parts of bentonite powder was spread over the tumbling pellets and water was sprayed over them until the shell or coat increased the weight of the original pellets by about 10%. The coated pellets were dried and heated in a rotary kiln substantially in the same manner as in Example 3. The resulting pellets had 93% of the iron content in the metallic form and no disintegration to fines and fragments was observed.

It has been found that the reduction process of the present invention can be employed with pellets containing iron oxides combined with other metal oxides, as for instance, in chromite ores, the chrome oxide therein being also reduced if a sufficient quantity of carbon particles is used in the pellets. Conventionally, chrome ores are reduced by carbon in electric arc furnaces in which costly electrical energy is converted to heat. In a known process it was proposed to make pellets from fine chromite ores, carbon particles, and a thermic agent such as ferrosilicon, and to heat such pellets in a rotary furnace to temperatures between 900°C and 950°C so that carbon monoxide developed from oxidation of the carbon would reduce the iron oxide, whereas the silicon would reduce the chrome oxide. Higher temperatures could not be employed because of excessive formation of fines.

In contrast, the process of the present invention makes it possible to heat the pellets to temperatures higher than 1,100°C, at which temperatures chrome oxide is reduced by carbon as expressed in a simplified manner by the equation (2) $Cr_2O_3 + 27/7\ C = 2/7\ Cr_7C_3 + 3\ CO$ Mixtures of chromite ore and non-silicious iron ore can also be used for this process as illustrated in the following example in which the ratio of the two ores in the pellets is such that the kiln-reduced pellets when smelted in an electric arc furnace yield a molten metal suitable for the manufacture of stainless steel. The following example also illustrates the discovery that abrasion of pellets during reduction in a rotary kiln is lessened when the pellets are preheated, without movement relative to each other, for example on a traveling grate, to a temperature in the range from about 300° to about 800°C. The preheating is preferably accomplished with hot gases devoid of CO and hydrogen and which contain free oxygen in an amount by volume from about 1 to about 5% to preclude premature surface reduction of the pellets. Such hot gases are blown through the bed of pellets on the grate.

EXAMPLE 6

The constituents for the pellets were ground to pass 150 mesh Tyler sieve. The mixture consisted of:
- 54 parts magnetite containing 65% Fe, 6.5% $SiO_2$
- 22 parts chrome ore containing 19.2% Fe, 30.2% Cr
- 18 parts coke containing 85% C
- 6 parts limestone containing 50% CaO The mixture was moistened with about 12% of a 5% aqueous solution of sodium silicate and shaped into pellets having a diameter of about 16 mm (0.63 in.). The pellets, after drying, were dipped into a 25% aqueous solution of sodium silicate as in Example 4. Subsequently, the pellets were dried and preheated to about 600°C on a traveling grate as described above, about 1% free oxygen by volume being present in the hot combustion gases used for the preheating. The preheated pellets were then charged into a rotary kiln and heated to about 1,290°C in the same manner as described in Example 3. A ring did not form on the kiln wall to any significant extent and the pellets did not break to pieces. The cooled pellets contained 52.0% reduced Fe, 5.9% FeO, 7.7% reduced Cr, 2.8% $Cr_2O_3$, 6.7% C, and 0.1% S, i.e. 91.5% of the iron and 80% of the chromium were reduced.

After smelting the reduced pellets from Example 6 electrically and removal of the slag, the hot metal bath was found to contain 78.2% Fe, 13.5% Cr, 8.0% C, and 0.01% S and would yield stainless steel after the conventional oxygen below, refining, and finishing.

It has been stated previously that chromite ore alone can serve as the iron oxide-bearing material in carrying out the present invention. This is illustrated in the following example.

EXAMPLE 7

Pellets were made from 100 parts chromite ore, 29 parts coke, and 1 part limestone, all ground to pass a 150 mesh Tyler sieve. The pellets were made and reduced in the same manner as in Example 6. No pellet deterioration was observed. The reduced pellets contained 33.2% total Cr, 27.2% reduced Cr, 21.1% total Fe, 19.3% reduced Fe, and 7.8% C. After addition of calcium oxide to the pellets and electric furnace smelting, a high carbon, low silicone ferrochrome alloy was obtained which contained 55% Cr, 35.2% Fe, 8.2% C, 0.26% Si, and 0.013% S and was suitable for the manufacture of stainless steel.

Pellets reduced in the rotary kiln according to the process of the present invention contain surfur derived, at least in large part, from the carbon used as a reductant. The present invention comprehends the economical removal of such sulfur from the pellets although it is clear that the procedure used for the purpose may be applied to sulfur-containing pellets obtained by different reduction processes.

The reduced pellets are preferably desulfurized right after their discharge from the rotary kiln, that is, without intermediate cooling. The hot pellets are mixed with one or more particulate sulfur acceptors, i.e. materials which at elevated temperatures will readily react with sulfur to form relatively stable sulfides, from the group consisting of the oxides and carbonates of calcium, magnesium, and manganese; burnt lime and burnt dolomite being preferred. The sulfur acceptor is used in a quantity exceeding the theoretical requirement (as set out in equations 3 and 4 below) and the mixture of reduced pellets and sulfur acceptor is maintained in the temperature range between about 1,200° and 600°C in an atmosphere of hydrogen for a sufficient period of time to permit reduction of the sulfur content in the pellets to the desired or an acceptable level. It will be understood that the reactions involved are accelerated by the use of higher temperatures within the range. After cooling to a temperature below about 300°C, the mixture is separated by conventional means, such as screening, into desulfurized pellets and spent sulfur acceptor.

The reactions involved may be expressed by the following equilibrium relation and equation respectively:

(3) $FeS + H_2 \rightleftarrows Fe + H_2S$
(4) $H_2S + CaO = CaS + H_2O$

It has been found that despite the relatively high density of the reduced pellets, the reactions proceed at a practical rate, reduction of the sulfur content from about 0.1 to less than 0.03% being readily accomplished in less than 0.75 hours.

Other benefits also result from the desulfurization step since residual ferrous oxide in the pellets discharged from the rotary kiln is reduced and the density of the pellets is increased. Such reduction of ferrous oxide is based on the equilibrium relation (5) $FeO + H_2 \rightleftarrows Fe + H_2O$ The desulfurization of hot pellets as discharged from the kiln is most economical because the sensible heat of the pellets can be utilzed. However if necessary or desired, already cooled pellets may be used and the mixture of pellets and sulfur acceptor may be heated to a temperature from about 600°C to about 1,200°C in a hydrogen atmosphere.

The following example illustrates the desulfurization step.

EXAMPLE 8

Pellets were made from a mixture of 100 parts of a fine magnetite concentrate containing 68.3% total Fe, and 24 parts of coke fines passing a 32 mesh Tyler sieve and containing 86% C. After kiln reduction of the pellets substantially according to the process in Example 3, a sample of the pellets was cooled and analyzed. The analysis showed 85.81% total Fe, 82.64% metallic Fe, and 0.14% S. The degree of reduction was accordingly 96.3%. The apparent density of the reduced pellets was 3.16 g/cm³.

100 parts of the hot pellets as discharged from the kiln and having a temperature of about 1,250°C were mixed with 3 parts burnt lime (CaO) passing a 20 mesh Tyler sieve and the mixture was charged, avoiding any unnecessary heat losses, into a preheated container provided with insulation. Three parts by weight of hot hydrogen were passed through the mixture, the temperature of which was allowed to drop to about 600°C within 40 minutes. Then the mixture was cooled to below 300°C and the spent lime, containing 4.0% S, was screened from and blown off the pellets. The pellets then contained 87.2% total Fe, 85.8% metallic Fe, and 0.022% S. The degree of reduction was improved to 98.5%. The apparent density of the pellets had increased to 3.22 g/cm³. Such pellets can be used for the manufacture of iron powder if the pellets are prepared for the kiln reduction in the novel manner hereinafter described.

In known processes for making iron powder by reduction of iron oxides by gases at medium temperature relatively pure oxides are required, the reaction is quite slow, and the product is a coherent mass of iron particles which must be ground dry since the iron particles react with water. The use of higher temperatures is avoided as the sintered mass thus obtained as a product is difficult to grind because of the ductility of the metal.

In the present novel method of making iron powder from reduced pellets, the pellets are formed from a mixture of non-silicious iron oxide-bearing material and carbon particles with a finely-divided, non-metallic matrix material, said matrix material, when heated to metallizing temperatures in a rotary kiln in accordance with the present invention, being unreduced by carbon by providing in the pellets a refractory network, of nonmetallic particles with a small amount of a liquid silicious eutectic. Such a network hinders a crystal growth of the reduced metal. The liquid phase must be limited in volume to avoid deformation of the pellets and their agglomeration to large masses in the kiln. The nonmetallic particles may be oxides of Ca, Mg, Al, Ti, Si, or combinations thereof. The matrix material may vary between about 20 and 60% of the pellets and the liquid phase should not exceed about 10% of the network. In most instances there will be a sufficient amount of silica or silicates in the iron oxide-bearing ore used to supply the flux. The other non-metallic material can be added in fine granular or powdered form, or may be included as impurities in the raw materials for the pellets.

These pellets, after such of the treatment procedures described herein as are desired, are heated for reduction in a rotary kiln in the manner taught herein and are thereafter cooled and ground in water. The resulting slurry is separated magnetically into a fraction consisting mainly of iron powder and a lesser amount of nonmagnetic fraction. It is preferred to use reduced pellets which have been desulfurized in the manner described above.

The production of iron powders in accordance with the present novel process is illustrated in the following examples.

EXAMPLE 9

Pellets were made from 100 parts of a titaniferous magnetite concentrate containing 54.0% total Fe, 8.9% $SiO_2$, 5.5% $TiO_2$, 5.1% $Al_2O_3$, 3.1% CaO, MgO, and 0.6% S in admixture with 17.6 parts coke and 25.2 parts limestone. Each of the three constituents was ground to pass a 100 mesh Tyler sieve. A small amount, about 12 parts, of a 10% aqueous solution of sodium silicate was used as binder for the pellets. After drying, the pellets contained 52.3% $Fe_3O_4$, corresponding to 37.8% Fe, and 6.2% $SiO_2$. They were reduced in the manner described in Example 3 and desulfurized as described in Example 8. The resulting pellets, after cooling, were crushed to pass a 24 mesh Tyler sieve and the crushed material was mixed with water and ground wet in a ball mill for 20 minutes to form a slurry which was stirred and washed with water in a magnetic field. The non-magnetic fines were removed with the wash water. The magnetic portion was again ground wet in a ball mill for 15 minutes and the resulting slurry was stirred and washed in a magnetic field. The wash water removed a small amount of fine impurities liberated by the second grinding. The remaining magnetic powder was separated by filtration, dried in a current of warm air, and finally dried in a vacuum to remove traces of moisture. From 100 parts of desulfurized pellets containing 58.0% Fe, the yield was 57 parts iron powder containing 95.2% metallic Fe.

Similar results were obtained by essentially the same procedure using pellets in which the non-silicious iron oxide-bearing material was a mixture of fines and dust collected from a blast furnace and a basic oxygen furnace and other pellets in which the iron oxide-bearing material was an ilmenite ore with a low gange content. In both cases, the results were similar, an iron powder containing over 95% metallic iron being recovered. In the latter case the non-metallic fines could be used in the making of titanium products.

Percentages and parts referred to in the foregoing description and the appended claims are by weight unless otherwise indicated.

It will be clear from the foregoing that the present invention comprehends modifications and variations other than those of the specific examples set out above. For example, in other experiments not set forth herein, fuel oil as a fuel instead of combustible gas was successfully employed.

I claim:

1. In a process for treating pellets formed from a mixture of iron oxide-bearing material containing no more than about 10% silica and particulate carbon to produce metallization by the reduction of the iron oxide in said material while said pellets are passed, without being surrounded by discrete solid carbonaceous particles separate from said pellets, through a rotating tubular kiln, said kiln having an inlet end and a discharge end, in cascading paths and generally countercurrent to the hot products of combustion from a combustion zone in which there is a heating flame from a burner supplied with fluid fuel, the improvements which comprise:
   a. using pellets which contain particulate carbon in at least the ratio with respect to the iron oxide present, calculated as FeO, required by the equation:

   $$FeO + C = Fe + CO;$$

b. establishing said combustion zone in said kiln adjacent the discharge end of said kiln;
   c. heating said pellets continuously to progressively higher temperatures in their passage through said kiln to a temperature in excess of 1,100°C but below the temperature at which said pellets fuse together, whereby carbon monoxide is formed by said metallization;
   d. providing said heating flame with oxygen in an amount exceeding the amount required for complete combustion of said fuel and maintaining in the portion of said combustion zone adjacent the discharge end of said kiln, for contacting said pellets, from 0.1 to 5.0 vol. % of free oxygen.
   e. introducing additional free oxygen into the hot combustion gases leaving at a point between said combustion zone and said inlet end. and
   f. passing said pellets through said kiln in less than 1.5 hours.

2. A process as set forth in claim 1 wherein said additional free oxygen is introduced in such an amount as to oxidize at least a substantial amount of said carbon monoxide.

3. A process as set forth in claim 1 in which the length of said combustion zone is limited to a distance from said discharge end of not more than six times the inside diameter of said kiln.

4. A process as set forth in claim 1 wherein the paths of said pellets through said kiln are shortened by sloping said kiln at an constant angle of from about 2° to 10° from the horizontal, the slope used increasing with increasing length of the kiln.

5. A process as set forth in claim 1 in which the ratio of kiln length of the inside diameter thereof is less than 15:1.

6. A process as set forth in claim 1 in which said pellets prior to charging into said kiln are heated, without movement relative to each other, to a temperature between about 300° and about 800°C.

7. A process as set forth in claim 6 in which said heating without relative movement is by hot gases containing from about 0.1 to 5.0 vol.% of free oxygen.

8. A process as set forth in claim 1 in which said pellets contain an excess of carbon particles over the amount necessary for reduction of the iron oxide therein.

9. A process as set forth in claim 1 in which, discrete carbon particles separate from said pellets are present with said pellets in said combustion zone and sufficient oxygen is provided in said combustion zone to combust a major proportion of said separate carbon particles, said particles being present in such minor amount as not to embed said pellets.

10. A process as set forth in claim 1 in which said pellets are provided with a coating thereon comprising finely divided iron oxide-bearing material, carbon particles, and from about 1 to 5% of a clay binder.

11. A process as set forth in claim 10 in which said binder is bentonite and said coating is free from chemically uncombined ferric oxide.

12. A process as set forth in claim 1 in which said pellets contain finely divided chromite ore.

13. A process as set forth in claim 12 in which said pellets contain an excess of carbon particles over the amount necessary for reduction of the iron oxide and chromium oxide therein.

14. A process as set forth in claim 1 in which said iron oxide-bearing material in said pellets is titaniferous.

15. A process as set forth in claim 1 in which said pellets, after cooling, are ground under water and the resulting slurry is magnetically separated into a magnetic fraction and a non-magnetic fraction.

16. A process as set forth in claim 1 in which the resultant pellets containing sulfur and metallic iron are mixed with at least one particulate sulfur acceptor selector from the group consisting of the oxides and carbonates of calcium, magnesium, and manganese and are then maintained in the temperature range between about 1,200° and about 600°C in a hydrogen atmosphere for a period of time in excess of 30 minutes and sufficient to reduce the sulfur content of said pellets to the desired level, whereupon said mixture is cooled to a temperature below 300°C and separated into pellets low in sulfur and spent sulfur acceptor.

17. A process as set forth in claim 16 in which said pellets are ground under water and the resulting powder is magnetically separated into a magnetic fraction and a non-magnetic fraction.

18. In a process for treating pellets formed from a mixture of iron oxide-bearing containing no more than about 10% silica and particulate carbon to produce metallization by the reduction of the iron oxide in said material while said pellets are passed, without being surrounded by discrete solid carbonaceous particles separate from said pellets through a rotating tubular kiln, said kiln having an inlet end and a discharge end, in cascading paths and generally countercurrent to the hot products of combustion from a combustion zone in which there is a heating flame from a burner supplied with fluid fuel, the improvements which comprise:

a. employing a kiln in which the ratio of length to inside diameter is less than 15:1 and which has a constant slope, said slope being greater the greater the length of said kiln, of from about 2° to about 10° from the horizontal whereby to shorten the paths of said pellets through said kiln.

b. using pellets which contain particulate carbon in at least the ratio with respect to the iron oxide present, calculated as FeO, required by the equation:

$$FeO + C = Fe + CO;$$

c. establishing said combustion zone in said kiln adjacent the discharge end of said kiln and limiting the length thereof to a distance from said discharge end of not more than six times the inside diameter of said kiln;

d. heating said pellets continuously to progressively higher temperatures in their passage through said kiln to a temperature in excess of 1,100°C but below the temperature at which said pellets fuse together, whereby carbon monoxide is formed by said metallization;

e. providing said heating flame with oxygen in an amount exceeding the amount required for complete combustion of said fuel and maintaining in the portion of said combustion zone adjacent the discharge end of said kiln, for contacting said pellets, from 0.1 to 5.0 vol. % of free oxygen;

f. introducing additional free oxygen into the hot combustion gases at a point between said combustion zone and said inlet end; and g. passing said pellets through said kiln in less than 1.5 hours.

* * * * *

UNITED STATES PATENT AND TRADEMARK OFFICE
CERTIFICATE OF CORRECTION

PATENT NO. : 3,894,865
DATED : July 15, 1975
INVENTOR(S) : Fritz O. Wienert

It is certified that error appears in the above-identified patent and that said Letters Patent are hereby corrected as shown below:

Col.1; line 53, -- as -- has been inserted after "has" and "of" has been deleted; line 58, "pellet" has been changed to --pellets --; line 64, "fines" has been changed to -- fine --.

Col. 3; line 61, "piece" has been changed to -- pieces --.

Col. 4; line 48, "given" has been changed to -- illustrated --; line 51, a comma has been inserted after "kiln"; line 53, after "end", "where" has been changed to -- were --.

Col. 5; line 27, "Amount of additional" has been changed to -- Also a small amount of additional --.

Col. 6; line 57, -- furnace -- has been inserted before "burden".

Col. 8; line 34, "below" has been changed to -- blow --.

Col. 10; line 5, "temperature" has been changed to -- temperatures --; line 19, "by" has been changed to -- but --; line 43, "powders" has been changed to -- powder --.

Col. 11; line 62, (Claim 1) "leaving" has been cancelled.

Claim 5, line 2, "of" has been changed to -- to --.
Claim 16, line 4, "lector" has been changed to -- lected --.
Claim 18, line 2, -- material -- has been inserted after "oxide-bearing".

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*